United States Patent

Graham

Patent Number: 5,630,497
Date of Patent: May 20, 1997

[54] VIBRATORY PARTS FEEDER WITH PIVOTAL TOP CONFINEMENT

[76] Inventor: S. Neal Graham, 12997 Fawns Ridge, Fishers, Ind. 46038

[21] Appl. No.: 389,241

[22] Filed: Feb. 16, 1995

[51] Int. Cl.$^6$ .................................. B65G 47/24
[52] U.S. Cl. .................. 198/391; 198/380; 198/389
[58] Field of Search ........................ 198/380, 389, 198/391; 221/160, 167

[56] References Cited

U.S. PATENT DOCUMENTS

| | | |
|---|---|---|
| 2,872,019 | 2/1959 | Owen .................................. 198/389 |
| 3,150,762 | 9/1964 | Tricinci ............................... 198/380 |
| 3,295,661 | 1/1967 | Mitchell, Jr. et al. . |
| 3,474,890 | 10/1969 | Center . |
| 3,521,735 | 7/1970 | Gallatin . |
| 3,578,142 | 5/1971 | Burgess, Jr. . |
| 3,907,099 | 9/1975 | Smith . |
| 4,148,389 | 4/1979 | Dixon . |
| 4,206,539 | 6/1980 | Weresch . |
| 4,436,197 | 3/1984 | MacDonald . |
| 4,450,948 | 5/1984 | Naito et al. . |
| 4,700,827 | 10/1987 | Haaser . |
| 4,709,798 | 12/1987 | Herzog .................................. 198/380 |
| 4,947,982 | 8/1990 | Miyaki . |
| 5,083,654 | 1/1992 | Nakajima et al. .................... 198/380 |
| 5,191,960 | 3/1993 | Wareham . |

*Primary Examiner*—Joseph E. Valenza
*Attorney, Agent, or Firm*—Woodard, Emhardt, Naughton, Moriarty & McNett

[57] ABSTRACT

A vibratory parts feeder includes a pivotal top confinement member rigidly securable to the parts feeder. The parts feeder includes an adjustable width parts channels for orienting parts having a variety of sizes. One embodiment is intended for orienting headed parts having elongated shafts and includes an air block adjacent a parts orienting unit which provides a pressurized air stream against the flow of parts, and at an acute angle relative to an axis perpendicular to the parts flow path, for directing misoriented parts back into the parts feeder. An alternate embodiment is intended for orienting non-headed parts such as nuts and washers. The vibratory parts feeder of either embodiment is configured to minimize parts jams therein.

33 Claims, 7 Drawing Sheets

VIBRATORY PARTS FEEDER WITH PIVOTAL TOP CONFINEMENT

FIELD OF THE INVENTION

The present invention generally relates to the field of article feed mechanisms and sorters, and more particularly to vibratory parts feeders.

BACKGROUND OF THE INVENTION

Vibratory parts feeders are commonly known apparata for providing oriented parts from a mass of disoriented parts, or for transporting parts along a processing path. In providing oriented parts, a vibratory parts feeder typically includes a vibratory bowl which is driven by a vibratory drive unit. The bowl is internally configured, typically with a helically oriented path, to transport the parts under vibratory action to a bowl exit location near the top of the bowl.

A variety of mechanisms for orienting the parts are known to be operatively associated with a vibratory bowl apparatus. U.S. Pat. No. 4,436,197, for example, discloses a pair of spaced-apart rails which slope downwardly so that properly oriented parts may slide down the path to the lower section of the track. A gate associated with the track permits only those parts having the desired orientation to continue sliding down the track. U.S. Pat. No. 3,578,142 utilizes a different approach in that the parts transportation path of the bowl is configured to define an adjustable slot for receiving only parts having a particular orientation therein. As the parts are thereafter transported to the exit location near the top of the bowl, the adjustable slot manipulates the parts into the desired orientation.

A common problem associated with serially providing oriented parts from a vibratory bowl is maintaining the orientation of the properly oriented parts under the continuing vibratory action. As a solution to this problem, several vibratory parts feeders utilize some type of top confinement mechanism to minimize further agitation of the oriented parts. For example, U.S. Pat. Nos. 3,907,099, 4,206,539 and 5,191,960 include a downwardly sloped parts track having fixed top surface for confining the oriented parts to the track. Other known vibratory parts feeders utilize hinged top confinement structures that are moveable away from their confining positions to thereby allow access to the parts orientation track for clearing jams and performing other maintenance related functions.

Common problems associated with such known hinged confinements include excessive movement of the top confinement due to inadequate securing of the hinge mechanism and a lack of fixed positioning as the top confinement is returned to its operating position. Such hinged confinement mechanisms have not gained popularity since, due to the nature of the vibratory action, confinement structures inadequately secured to the vibratory bowl create dead spots and operation inefficiencies that result in fluctuations in feed rate. One solution to the inadequate securing problem is disclosed in U.S. Pat. No. 4,700,827 as including a top confinement structure with a series of zero lash hinges at one end and a corresponding series of clasp-type latches at the other. The problem of lack of fixed positioning is not discussed in this reference.

What is therefore needed is a top confinement apparatus that is moveable to permit access to the parts orientation track, but which securely attaches in a repeatably accurate location to the vibratory bowl in its operable position to provide a reliable and accurate top confinement mechanism.

SUMMARY OF THE INVENTION

Many of the problems and shortcomings of the prior art are overcome with the present invention. In accordance with one aspect of the present invention, a parts feeding apparatus for providing oriented parts having common configuration comprises a vibratory bowl having a discharge port, wherein the bowl is configured to receive a disoriented mass of the parts therein, and has an inner surface configured to transport each of the parts, in a circumferential manner, toward the discharge port under vibratory action, and a parts orientation unit detachably mounted to the bowl adjacent the discharge port for vibration therewith. The parts orientation unit receives parts having a number of orientations from the discharge port and serially provides the parts in a predetermined orientation. The parts orientation unit includes a receiving unit mounted adjacent the discharge port for receiving the parts therefrom and orienting the parts according to the predetermined orientation, and a confining member pivotably attached to the bowl. The confining member is pivotable between a first position adjacent the receiving unit and a second position remote from the receiving unit. The confining member includes a locking member positioned adjacent the pivotable attachment. The locking member rigidly secures the confining member in the first position to thereby maintain the parts in the oriented manner when the locking member is in a locked position, and the locking member permits the confining member to freely pivot between the first and second positions when the locking member is in an unlocked position.

In accordance with another aspect of the present invention, a parts feeding apparatus for providing oriented parts having common configuration comprises a vibratory bowl having a discharge port, wherein the bowl is configured to receive a disoriented mass of the parts therein, and has an inner surface configured to transport each of the parts, in a circumferential manner, toward the discharge port under vibratory action, and a parts orientation unit detachably mounted to the bowl adjacent the discharge port for vibration therewith. The parts orientation unit receives parts having a number of orientations from the discharge port and serially provides the parts in a predetermined orientation. The parts orientation unit includes a receiving unit mounted adjacent the discharge port for receiving the parts therefrom, wherein the receiving unit includes first and second parallel blades defining a channel therebetween for orienting the parts according to the predetermined orientation. The first and second parallel blades are adjustably mounted to the bowl to provide a range of channel widths. The parts orientation unit further includes a confining member pivotably attached to the bowl, wherein the confining member is pivotable between a first position adjacent the channel and a second position remote from the channel. The confining member includes a locking member positioned adjacent the pivotable attachment. The locking member rigidly secures the confining member in the first position to thereby maintain the parts in the predetermined orientation within the channel when the locking member is in a locked position.

In accordance with a further aspect of the present invention, a parts feeding apparatus for providing oriented parts having common configuration comprises a vibratory bowl having a discharge port and a parts supply tract positioned adjacent the discharge port, wherein the bowl is configured to receive a disoriented mass of the parts therein, and has an inner surface configured to transport each of the parts along the parts supply tract, in a first direction toward the discharge port, under vibratory action. A parts orientation unit is detachably mounted to the bowl and is operable to receive parts having a number of orientations from the parts supply tract to serially provide the parts with a predetermined orientation. A pressurized air supply unit is adjustably mounted to the vibratory bowl adjacent the discharge port at an acute angle relative to the first direction, and the air supply unit is operable to supply a stream of pressurized air across the parts supply tract at the acute angle to thereby direct parts having orientations different than the number of orientations back into the vibratory bowl.

In accordance with yet a further aspect of the present invention, a parts orientation apparatus for use in cooperative arrangement with a vibratory bowl parts feeder to provide oriented parts having a common configuration, wherein the vibratory bowl has a mass of disoriented parts therein and a parts discharge port, and wherein the parts orienting apparatus is detachably mounted to the vibratory bowl adjacent the discharge port, comprises a receiving unit mounted adjacent the discharge port for receiving the parts therefrom and orienting the parts according to the predetermined orientation, and a confining member pivotably attached to the bowl. The confining member is pivotable between a first position adjacent the receiving unit and a second position remote from the receiving unit. The confining member including a locking member positioned adjacent the pivotable attachment. The locking member rigidly secures the confining member in the first position to thereby maintain the parts in the oriented manner when the locking member is in a locked position. The locking member permits the confining member to freely pivot between the first and second positions when the locking member is in an unlocked position.

It is one object of the present invention to provide a vibratory parts feeding apparatus having a pivotal top confinement member rigidly securable to the vibratory parts feeder.

It is another object of the present invention to provide a vibratory parts feeder having an adjustable parts orientation channel for orienting parts of different sizes.

It is a further object of the present invention to provide a vibratory parts feeder having an adjustably positionable air block at a parts orienting unit for providing a pressurized air stream directed against the flow of parts at an acute angle relative to an axis transverse to the flow path, to thereby direct misoriented parts back into the parts feeder.

It is yet another aspect of the present invention to provide a vibratory parts feeder configured to minimize parts jams therein.

These and other objects of the present invention will become more apparent from the following description of the preferred embodiment.

DESCRIPTION OF THE PREFERRED EMBODIMENT

Figure 1:
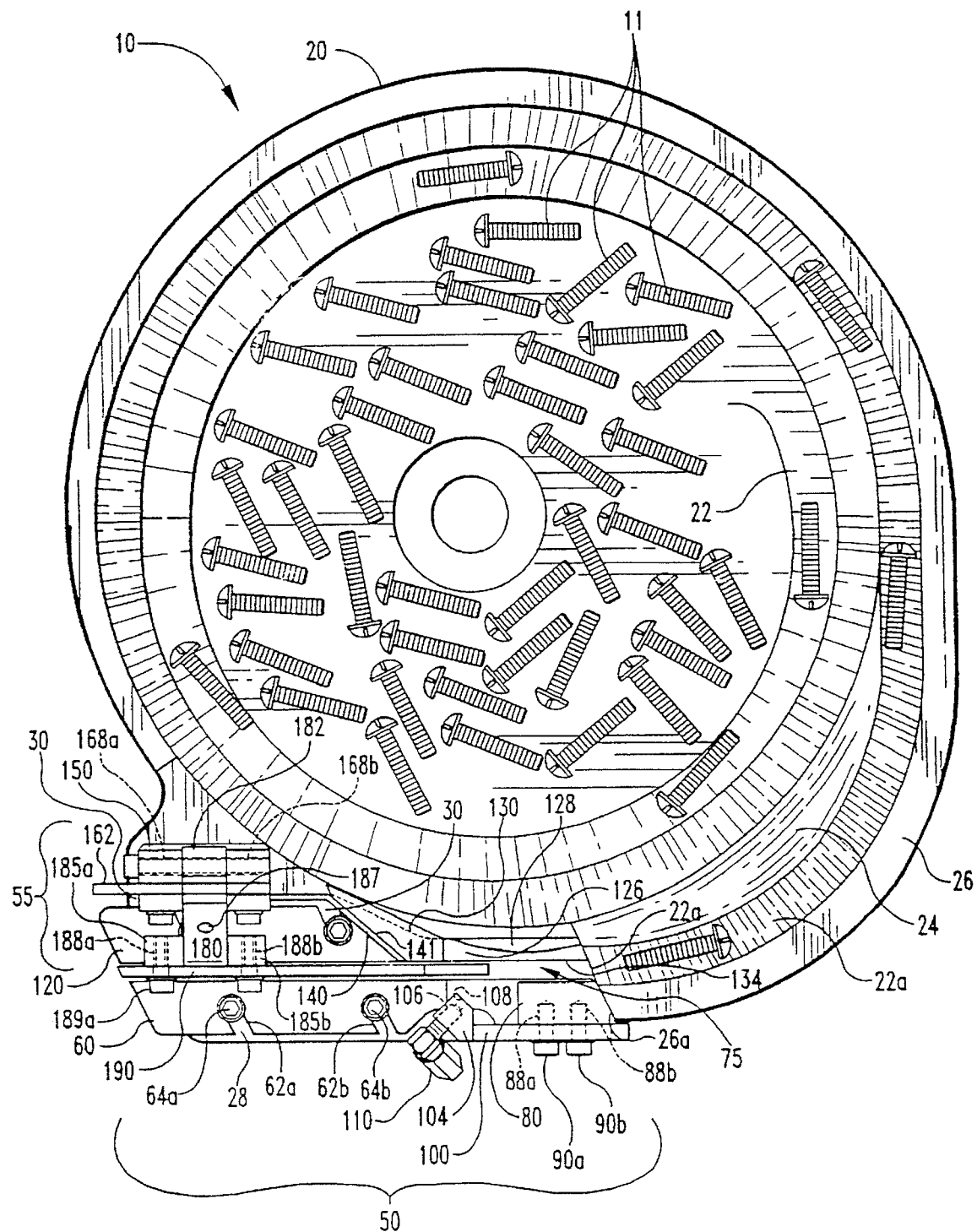
FIG. 1 is a top plan view of a vibratory parts feeder with pivotal top confinement in accordance with one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIGS. 1–4, a vibratory parts feeder for providing oriented headed parts, in accordance with one embodiment of the present invention, is shown. The vibratory parts feeder 10 may be used to orient a variety of headed parts including, for example, screws, nails, bolts, rivets, and the like. The parts feeder 10 generally includes a vibratory bowl 20 having a helical parts track 22 defined therein, and a parts orientation unit 50 which includes a pivotal top confinement apparatus 55.

As is commonly known in the industry, vibratory bowl 20 is actuated by a vibratory drive unit (not shown) to thereby cause disoriented parts 11 contained within the bowl 20 to travel up the helical parts path 22, to a parts discharge port 22a. In a preferred embodiment, vibratory bowl 20 is a polycast bowl, although the present invention contemplates that vibratory bowl 20 may be constructed from other suitable materials such as, for example, stainless steel. As is common with many vibratory bowls, the parts track 22 includes a sloped portion 24 located near the discharge port 22a, so that certain disoriented parts, such as side-by-side or sideways parts, will slide back into the interior of the bowl 20. Additionally, the bowl 20 includes an upper rim 26 which is positioned sufficiently above the parts track 22 to keep the parts from being ejected from the bowl 20 under the vibratory action. Vibratory bowl 20 further defines a parks orientation member 25 extending from the discharge port 22a. Parts orientation member 25 includes surfaces 28, 30, 34, and 36 for mounting the parts orientation unit 50 and pivotal top confinement apparatus 55 thereto.

Parts orientation unit 50 includes a pair of parallel blades 60 and 120 which define an adjustable-width channel 75 therebetween for orienting the headed parts in a manner to be more fully described hereinafter. Outside parallel blade 60 includes a pair of grooves 62a and 62b for adjustably securing the blade 60 to surface 28 of vibratory bowl 20 via threaded screws or bolts 64a and 64b. As most clearly shown in FIG. 2, polycast bowl 20 includes a pair of rigid threaded inserts 42a and 42b molded within the bowl 20 for receiving corresponding threaded screws 64a and 64b. Inserts 42a and 42b are an important aspect of the present invention in that they provide a secure threaded attachment for screws 64a and 64b, and at the same time provide a wear-resistant attachment mechanism for permitting multiple adjustments of blade 60. Preferably, inserts 42a and 42b are made of a wear-resistant metal such as, for example, steel. Parallel blade 60 can thus be adjustably positioned toward and away from parallel blade 120 by loosening screws 64a and 64b and manually adjusting the blade 60. Blade 60 can thereafter be secured to orientation member surface 28 by tightening screws 64a and 64b into threaded inserts 42a and 42b.

Figure 3:
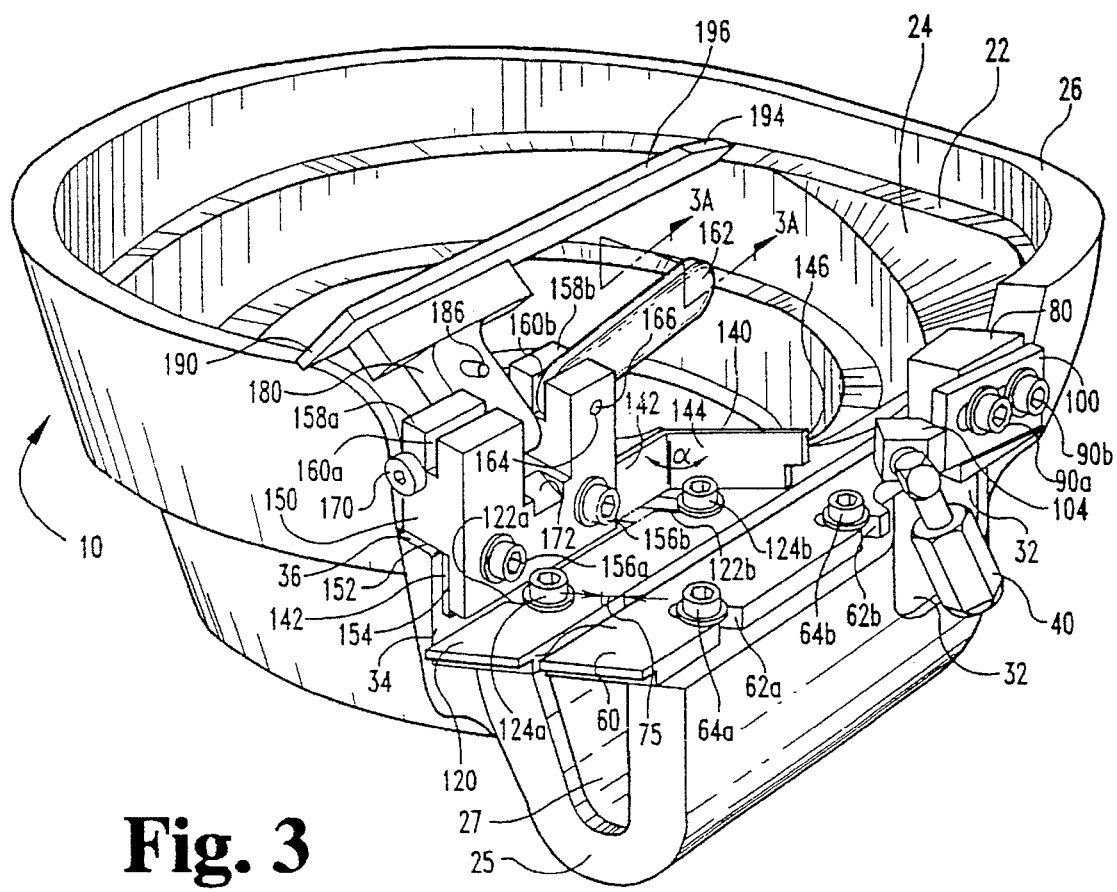
FIG. 3 is a right front perspective view of the embodiment shown in FIG. 1 showing the top confinement member pivoted away from its parts confining position.
Figure 5:
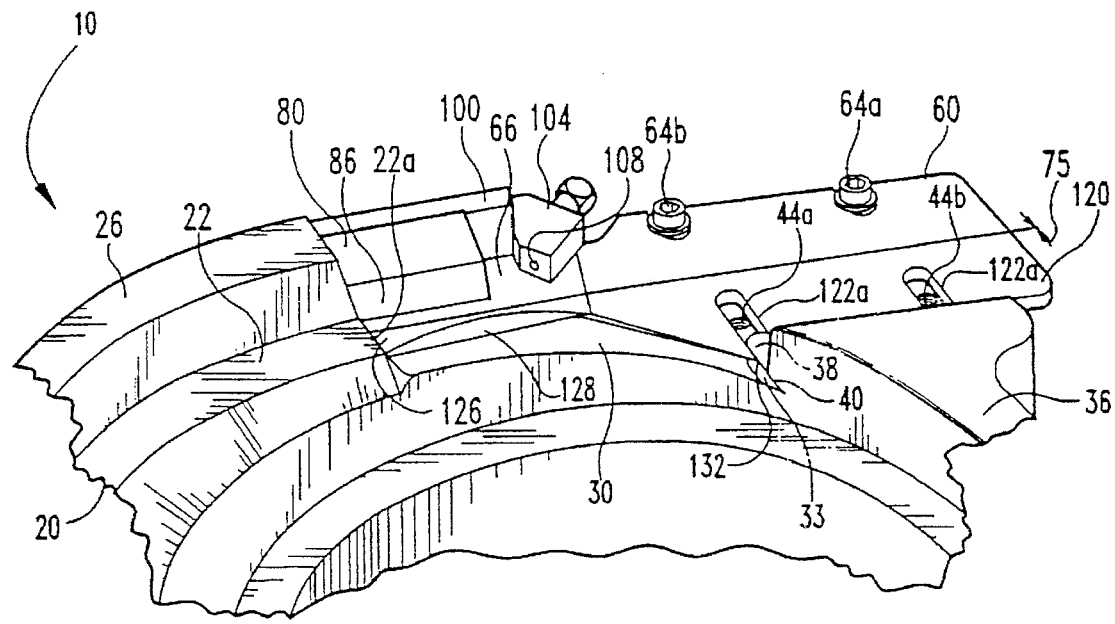
FIG. 5 is a left perspective view of the embodiment shown in FIG. 1, with the pivotal top confinement structure omitted therefrom for clarity, showing the parts receiving unit adjusted for minimal channel width.
Figure 6:
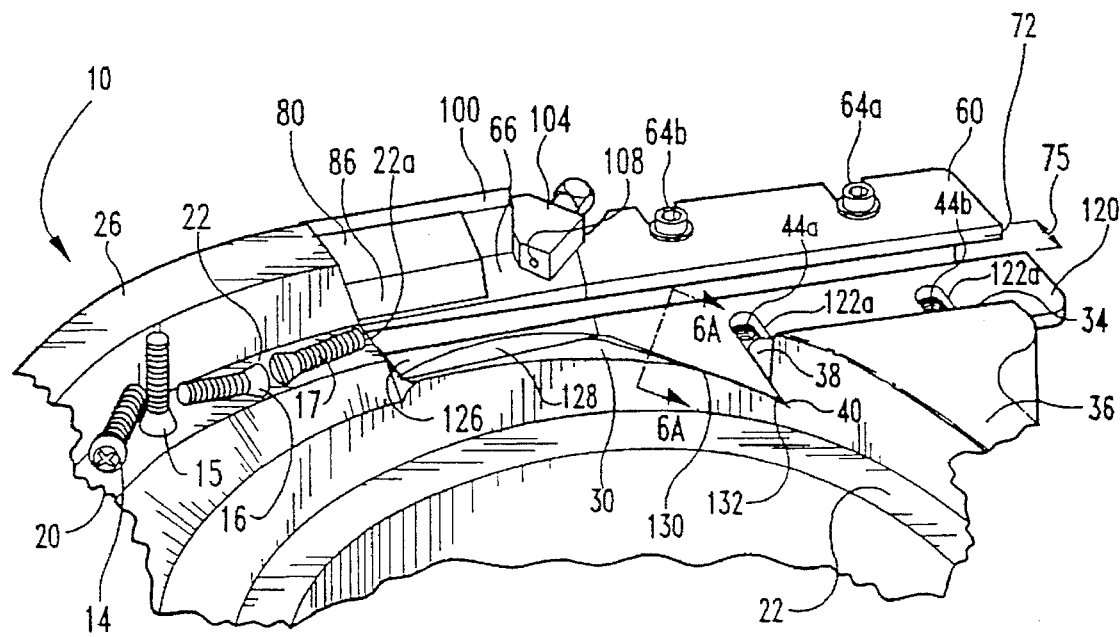
FIG. 6 is a view similar to that of FIG. 5 showing the parts receiving unit adjusted for maximum channel width.

As most clearly shown in FIG. 3, parallel blade 120 includes corresponding channels 122a and 122b for receiving screws 124a and 124b. As shown in FIGS. 5 and 6, orientation member surface 30 includes rigid inserts 44a and 44b, identical to inserts 42a and 42b, molded therein for receiving screws 124a and 124b.

Parallel blade 120 may therefore be adjustably positioned relative to blade 60 in a manner identical to that described in relation to the adjustable positioning of blade 60. Opposing faces 72 of blade 60 and 134 of blade 120 thus define an adjustable-width channel 75 therebetween. The channel width 75 may be adjusted ill the manner just described such that the heads of the headed parts to be oriented are supported by the parallel blades 60 and 120 while the shafts of the headed parts extend into a hollow recess 27 of the parts orientation member 25, as shown with respect to oriented screws 12 and 13 of FIG. 2.

Referring now to FIGS. 5 and 6, the parallel blades 60 and 120 are shown in their extreme positions. In FIG. 5, blades 60 and 120 are adjusted toward each other so that channel 75 has minimal width. With blades 60 and 120 in this position, vibratory parts feeder 10 could be used, for example, to provide oriented pins such as those used in the garment and sewing industry. In FIG. 6, blades 60 and 120 are adjusted away from each other so that channel 75 has maximum width.

As seen in FIGS. 5 and 6, blade 120 and bowl 20 are configured to provide an important aspect of the present invention. Bowl 20 defines a projection 38 which extends from bowl surfaces 30 and 34 and is configured to be received within channel 122a. Bowl 20 further defines a recess 40 between the projection 38 and the bowl surface 30 for receiving a projection 132 of parallel blade 120. In operation, projection 132 cooperates with projection 38 and recess 40 to provide a continuous surface 33 for directing misoriented parts back into the interior of the bowl 20 regardless of the position of blade 120. When the channel 75 is adjusted to maximum width, as shown in FIG. 6, projection 132 is received within recess 40 an projection 38 is fully received within channel 122a. However, as channel 75 is decreased in width, pointed projection 132 moves toward channel 75 while maintaining contact with surface 33 of projection 38. Thus, regardless of the position of blade 120 relative to the bowl 20, a substantially continuous surface 33 is maintained between the projection 132 and projection 38. In the absence of such a projection 38 a recess or slot would exist, thereby providing a potential parts jamming location. The configuration of projections 38 and 132 overcome this potential problem by providing continuous bowl surface 33 regardless of the position of blade 120.

Figure 6A:
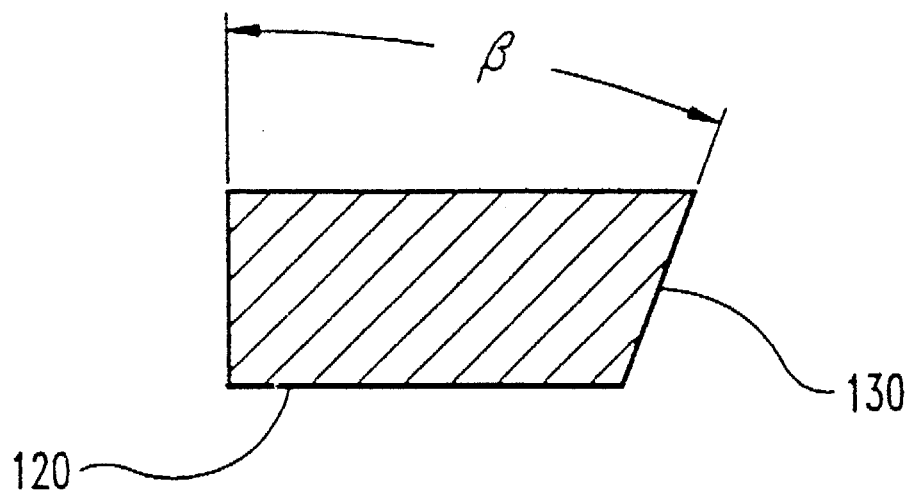
FIG. 6A is a cross-sectional view of a portion of the inside parallel blade of the embodiment shown in FIG. 1, taken along section lines 6A—6A of FIG. 6.

Referring now to FIGS. 6 and 6A, the underside of blade 120, in the vicinity of projection 132, defines a sloped surface 130. Surface 130 extends from the top surface of blade 120 toward surface 30 of bowl 20 at an angle β. Preferably, is approximately 21 degrees, although the present invention contemplates β angles of between approximately 5 degrees and 75 degrees. In operation, surface 130 may extend beyond surface 30 toward the interior of bowl 20 when, for instance, blade 120 is adjusted to provide a maximum channel width 75. In such a case, surface 130 could, if not properly configured, provide a potential parts jamming location between, for example, surface 130 and the parts track 22 located just beneath surface 130. However, by providing surface 130 at an angle β as shown in FIG. 6A, the potential for parts jams is greatly reduced. As parts progress along track 22, the angled surface 130 permits parts to reposition themselves on track 22 so that jams are thereby avoided.

Figure 2:
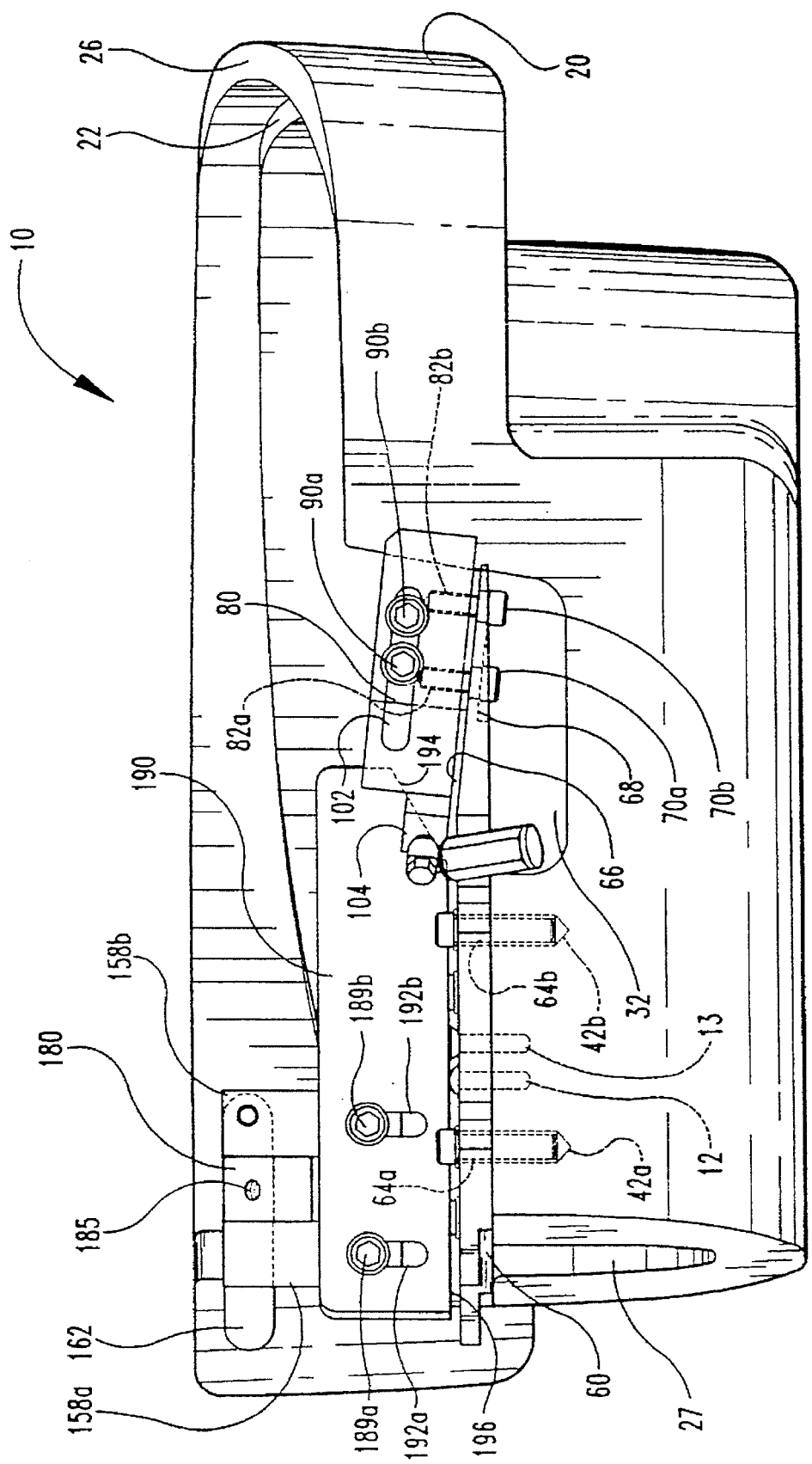
FIG. 2 is a side elevational view of he embodiment shown in FIG. 1.

Referring now to FIGS. 1–6, blade 60 includes a sloped face 66 between screw 64b and the parts discharge port 22a, as most clearly shown in FIG. 2. Parallel blade 120 includes an identically sloped face 126 located adjacent sloped face 66. Sloped faces 66 and 126 provide a slight ramp to facilitate proper orientation of he headed parts. Although a ramp provided by sloped faces 66 and 126 may be unnecessary in certain applications, it has been found that such a ramp slows headed parts having long shafts sufficiently to permit the shafts to drop into the open channel 75 before reaching the top confinement blade 190. Preferably, faces 66 and 126 are sloped at approximately 10 degrees, although the present invention contemplates both greater and lesser slopes depending upon the shaft lengths of the parts being oriented, and on the corresponding desired degree of slowing of the parts.

The parts orientation unit 50 further includes a guide block 80 attached to blade 60 via screws 70a and 70b. As most clearly shown in FIG. 2, blade 60 includes on its underside a recessed portion 68 which is sloped identically with surface 66. Such a sloped recess 68 permits the guide block 80 to be mounted flush with the sloped surface 66 via screws 70a and 70b into correspondingly threaded holes 82a and 82b of the guide block 80. As most clearly shown in FIG. 6, guide block 80 has a face 86 which is more or less vertically flush with surface 72 of parallel blade 60. Guide face 86 helps to maintain axial alignment of the headed parts with the longitudinal axis of the open channel 75. This feature will be illustrated for two separate cases. In the first case, a headed part, such as part 17 of FIG. 6, is advancing, shaft first, toward the discharge port 22a. As the shaft continues to advance over open channel 75, guide face 86 maintains axial alignment of the shaft with the longitudinal axis of the channel 75 until a sufficient portion of the shaft has advanced over the channel 75 so that the weight of the shaft causes the shaft to drop into the channel 75, and the headed part assumes the position of screw 12 shown in FIG. 2. In a second case, a headed part, such as part 16 of FIG. 6, is advancing, head first, toward discharge port 22a. In order for the shaft to drop into channel 75, as previously described, the part must advance over the channel 75 until the end of the shaft is free to drop within the slot 75. Guide face 86 maintains axial alignment of the headed part with the longitudinal axis of channel 75 until the end of the shaft can drop into the channel 75. In either case, guide face 86 keeps the headed part from moving transverse to the longitudinal axis of channel 75 until a properly oriented part can assume the position of, for example, screw 12 of FIG. 2. Misoriented parts traveling towards discharge port 22a are returned to the interior of the vibratory bowl 20 in one of at least four ways to be fully described hereinafter.

Guide block 80 further includes a pair of threaded holes 88a and 88b for receiving screws 90a and 90b, respectively, for attaching air block 100 thereto. Air block 100 includes an open channel 102 for receiving screws 90a and 90b. Air block 100 may therefore be adjustably positioned along an axis parallel with the longitudinal axis of channel 75, by sliding screws 90a and 90b within channel 102. Air block 100 may thereafter be rigidly secured to guide block 80 by tightening screws 90a and 90b. Air block 100 further includes a nozzle portion 104 having a bore 106 defined partially therein for receiving an air source fitting 110. An air outlet passage 108 is connected to bore 106 and provides air supplied to air source nozzle 110 across the channel 75. Another important aspect of the present invention is the positioning of the air nozzle 104 such that air is blown from air outlet 108 at an acute angle relative to an axis parallel to the longitudinal axis of channel 75. Thus, air nozzle 104 provides a stream of air not directly transverse to channel 75, but in a direction slightly opposing the flow of headed parts through the parts orientation unit 50. Such a stream of air is one method of returning misoriented parts, such as headed part 15 standing on its head, into the vibratory bowl 20. It has been found that providing a transverse, and slightly upstream, flow of air relative to the flow of parts is more effective for rejecting misoriented parts back into the vibratory bowl 20 than by merely providing an air stream transverse to the flow of parts. Preferably, the acute angle is set at approximately 45 degree, although the present invention contemplates acute angles of between approximately 10 degrees and just lander 90 degree. The height of air nozzle 104, and proximity of air nozzle 104 with respect to the guide block 80, is adjustable via screws 90a and 90b.

A second mechanism for returning misoriented parts, traveling toward discharge port 22a, is provided by appropriately configuring a portion of the sloped face 126 of the parallel blade 120. As most clearly seen in FIGS. 1 and 6, sloped face 126 includes a second sloped face 128 which slopes downwardly toward the interior of the vibratory bowl 20. Headed parts, such as part 14, which are unable to maintain axial orientation with the longitudinal axis of channel 75 may, either on their own or under the influence of the air stream exiting outlet 108, slide down the sloped face 128 and back into the vibratory bowl 20.

Referring now to FIGS. 1–4, the parts confinement unit 55 will now be described in detail. Confinement unit 55 includes a pivot support block 150 which has a bottom surface 152 adapted to rest on surface 36 of the vibratory bowl 20. Pivot support block 150 further includes a vertical surface 154 for engagement with a portion 142 of deflector 140. Portion 142 of deflector 140 is further in contact with vertical wall 34 of the vibratory bowl 20. Pivot support block 150 and deflector 140 have a pair of bores disposed therethrough (not shown) for receiving screws 156a and 156b. Although not shown in the figures, it is to be understood that vertical wall 34 of the vibratory bowl 20 includes threaded inserts, identical to inserts 42a and 42b, molded within the bowl 20 for receiving the screws 156a and 156b. Pivot support block 150 is thus mounted to the vibratory bowl 20 via screws 156a and 156b, received through correspondingly aligned bores in the pivot support block 150 and deflector 140, and secured to threaded inserts molded within the vertical wall 34 of the bowl 20.

Deflector 140 further includes an angled portion 144 which extends from portion 142 at an angle ∝ and terminates at the channel 75. In accordance with another important aspect of the present invention, deflector 140 serves two purposes. First, the screws 156a and 156b, more so than screws 64a, 64b, 124a, and 124b, are under considerable force to draw the screws away from the vertical surface 34 of the bowl 20, during operation of the parts confinement unit 55, as will be more fully discussed hereinafter. To prevent screws 156a and 156b from extracting the threaded inserts molded into the vertical face 34 of the bowl 20 under such force, the deflector portion 142, positioned between the pivot support block 150 and the vertical bowl face 34, acts as a washer to retain the threaded inserts within the vertical wall 34. Secondly, deflector 140 includes an angled portion 144 extending from deflector portion 142 at an angle ∝, and terminating at the channel 75. Angled portion 144 includes a surface 141 which provides a third mechanism for directing misoriented screws, advancing toward the discharge port 22a, back into the interior of the bowl 20. As most clearly shown in FIGS. 1 and 6, a misoriented screw, such as screw 14, may be partially received within the channel 75, although incorrectly oriented, and may not be directed back into the interior of the bowl 20 by the air stream exiting outlet 108 or by the sloped surface 128 of parallel blade 120. Such a screw will be directed back into the interior of the bowl 20 upon contact with the surface 141 of deflector 140. Preferably, $\alpha$ is set at approximately 140 degrees, although the present invention contemplates $\alpha$ angles of between just over 90 degree and approximately 170 degrees.

Figure 3A:
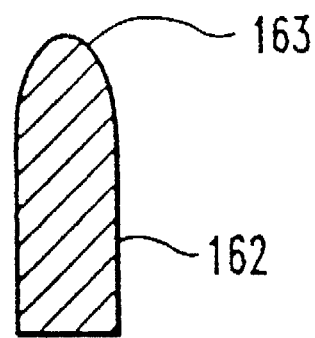
FIG. 3A is a cross-sectional view of the pivoting lever taken along section lines 3A—3A of FIG. 3.

Pivot support block 150 further includes a pair of projections 158a and 158b extending therefrom. Projection 158a includes a groove 160a therein having a longitudinal axis parallel to the longitudinal axis of channel 75. Projection 158b includes a similar groove 160b which is axially aligned with groove 160a. One end of a locking lever 162 is received within the channel 160b and is pivotably attached to pivot support block 150 thereat. The pivot support block 150 includes a bore 164 defined through projection 158b, which bisects channel 160b. Locking lever 162 includes a similar bore at one end thereof which, when received within channel 160b, is axially aligned with bore 164. A pin 166 extends through the bore 164 and the bore defined within the locking lever 162 to thereby pivotably attach the locking lever 162 within the channel 160b. As most clearly seen in cross-section in FIG. 3a, locking lever 162 has a rounded edge 163 which facilitates the entry of the locking lever 162 within grooves 160a, 160b, and groove 184 of pivot block 180 (FIG. 4).

Parts confining unit 55 further includes a pivot block 180 which is pivotably attached to pivot support block 150 via pin 170. As most clearly shown in FIG. 1, projection 158a of the pivot support block 150 defines a bore 168a therethrough which has a longitudinal axis parallel to the longitudinal axis of channel 160a. Similarly, projection 158b includes a bore 168b disposed therethrough which has a longitudinal axis parallel to the parallel axis of channel 160b. Pivot block 180 includes a bore 182, identical to bores 168a and 168b, through one end thereof. Bore 182 becomes axially aligned with bores 168a and 168b when pivot block 180 is positioned between projections 158a and 158b of pivot support block 150 as shown in FIGS. 1, 3, and 4. Pin 170 extends through bores 168a, 168b, and 182 to thereby pivotably attach pivot block 180 to pivot support block 150.

At an end opposite to the pivotable attachment to pivot support block 150, pivot block 180 defines a pair of projections 185a and 185b extending laterally therefrom in opposite directions. Projection 185a defines a bore 188a therethrough for threadingly receiving a screw 189a. Similarly, projection 185b defines a bore 188b therethrough for threadingly receiving a screw 189b. Parts confining unit 55 further includes a parts confining member 190, or top confinement blade, which is attached to pivot block 180 via screws 189a and 189b. As most clearly shown in FIGS. 2 and 4, top confinement blade 190 includes a pair of slots 192a and 192b for receiving screws 189a and 189b, respectively. The position of top confinement blade 190 relative to the pivot block 180, corresponding to the height of the top confinement blade 190 above the channel 75 as shown in FIGS. 2 and 4, is therefore adjustable through appropriate positioning of screws 189a and 189b within slots 192a and 192b, respectively. Finally, top confinement blade 190 includes an angled edge 194 which, when disposed in the position shown in FIGS. 2 and 4, is adjacent to the parts discharge port 22a. The purpose of angled portion 194 is two-fold. First, a screw, such as screw 15 of FIG. 6, may be received within the channel 75 head-first. If the air stream exiting outlet 108 does not direct the screw 15 back into the interior of the bowl 20, the sloped edge 194 of top confinement blade 190 is intended to topple the screw forward so that its shaft may be received within the channel 75. Secondly, a screw, such as screw 14 of FIG. 6, may not be directed back into the interior of the bowl 20 by either the air stream exiting outlet 108 or the sloped face 128 of the parallel blade 120. The sloped edge 194 of the top confinement blade 190 is further intended to provide a fourth mechanism for returning misoriented screws back into the interior of the bowl 20 by allowing such screws, such as screw 14, to continue traveling along the channel 75 until the deflecting surface 141 of deflector 140 can direct the screw back into the interior of the bowl 20.

Figure 4:
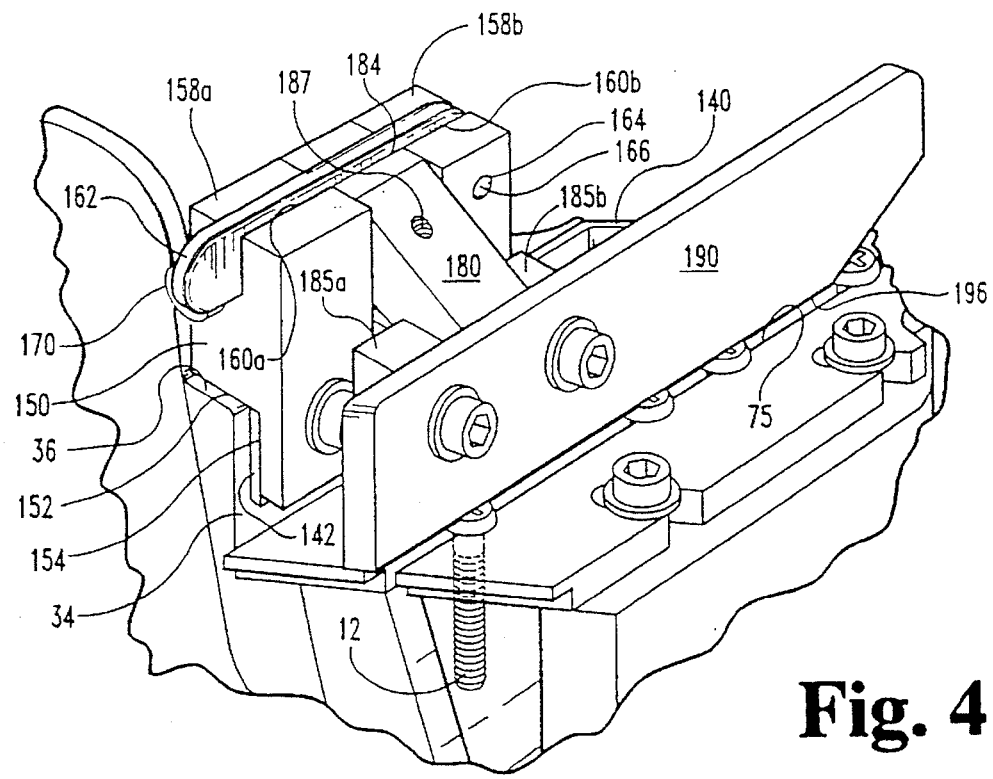
FIG. 4 is a right front perspective view of the embodiment shown in FIG. 1 showing details of the top confinement member in its parts confining position.

With the parts confining unit 55 just described, the top confinement blade 190 may be pivoted between a first position, shown in FIG. 3, and a second position, shown in FIG. 4, wherein the bottom edge 196 of the top confinement blade 190 provides a top confinement mechanism to keep the oriented parts from vibrating out of the channel 75. In its first position, the top confinement blade 190 is pivoted beyond 90 degree from its second position so that the combination of the pivot block 180 and top confinement blade 190 may maintain the first position under the force of gravity. In such a position, the parts feeding apparatus 10 may be initially set up by adjusting the various components of the parts orientation unit 50 such as the parallel blades 60 and 120, the guide block 80, the air block 100, and the deflector 140, and for clearing any parts jams that may occur during operation of the apparatus 10. In its second position, shown in FIG. 4, the edge 196 of the top confinement blade 190 is rigidly secured at a desired distance above the channel 75, in order to provide top confinement for the oriented parts 12 traveling through channel 75.

In order to rigidly secure the top confinement blade 190 and the pivot block 180 in their second position as shown in FIG. 4, pivot block 180 further includes a projection 186 disposed within bore 187 of pivot block 180 and extending from its underside as shown in FIG. 3. Pivot support block 150 includes an inclined surface 172 which contacts the projection 186 as the top confinement blade 190 is pivoted to its second position. Preferably, projection 186 is configured such that the top confinement blade 190 is positioned just above its second position when the projection 186 is in contact with surface 172 and the locking lever 162 is in its unlocked position as shown in FIG. 3. As most clearly shown in FIG. 4, pivot block 180 further includes a channel 184 which is identical in dimension to channels 160a and 160b. When projection 186 is in contact with surface 172 under the action of gravity, the top confinement blade 190 is positioned just above its second position of FIG. 4. In this position, channel 184 is not quite axially aligned with channels 160a and 160b. As locking lever 162 is pivoted toward channel 160a, the rounded edge 163 contacts one edge of the channel 184, forcing the channel 184 into axial alignment with channels 160a and 160b. Further pivoting of locking lever 162 permits the lever 162 to be received within channel 160a as shown in FIGS. 1, 2, and 4. When locking lever 162 is completely received within channel 160a, locking lever 162 is in its locked position. This sequence of pivoting the top confinement blade 190 and pivot block 150 to just above the second position such that the projection 186 contacts the surface 172 under the action of gravity and thereafter pivoting the locking lever 162 from its unlocked position to its locked position, as shown in FIGS. 1, 2, and 4 simultaneously forces the top confinement blade 190 and pivot block 180 into the second position and rigidly forces extension 186 against surface 172 so that the entire parts confining unit 55 is locked in a secure position. This ensures that none of the top confinement components will rattle under vibratory operation. Such a locking force can put substantial pressure on screws 156a and 156b, tending to force them outwardly toward the channel 75. Without some mechanism to maintain the threaded inserts within the vertical wall 34 of the polycast bowl 20, such a substantial force could result in the extraction of the threaded inserts from the bowl wall 34. The importance of the deflector portion 142 is thus immediately recognized in that it provides a counterforce, under the pressure of screws 156a and 156b, to retain the threaded inserts within the bowl wall 34. Although similar threaded inserts are incorporated within other areas of the polycast bowl 20, none are generally subject to such forces that require the inclusion of counterforce plates or washers.

In operation, the top confinement bar 190 is pivoted to its first position, as shown in FIG. 3, and the various components of the parts orientation unit 50 are adjusted, as previously described, to suit the dimensions of the particular parts being oriented. Such adjustments include, for example, positioning the top confinement bar 190 relative to the pivot block 180, adjusting the parallel blades 60 and 120 to thereby set the channel width 75, and adjusting the position of the air block 100. Once the set up procedure is completed, the top confinement bar 190 is pivoted to just above its second position, so that projection 186 contacts surface 172. Top confinement blade 190 is thereafter forced into its second position, as shown in FIGS. 1, 2, and 4, by pivoting the locking lever 162 from its unlocked position, shown in FIG. 3, to its locked position, shown in FIGS. 1, 2, and 4. With all of the components of the parts orientation unit 50 adjusted and solidly secured, the vibratory bowl 20 and parts orientation unit 50 may be vibrated, under the action of a vibratory drive unit, (not shown), so that a disoriented mass of parts 11 contained within the bowl 20 are transported, in a circumferential manner, along the parts track 22 toward the discharge port 22a. Parts having certain orientations, as previously discussed, will be oriented within the channel 75, and serially provided from the channel 75 in this oriented fashion. Parts traveling towards discharge port 22a that have orientations other than the number of orientations permitted in order for the parts to be received within the channel 75 are directed back into the interior of the bowl 22 by any of a combination of the downwardly sloped surface 128 of the parallel blade 120, the air jet stream exiting orifice 108 of the air block 100, the deflector surface 141 of deflector 140, and the angled edge 194 of the top confinement blade 190.

Figure 7:
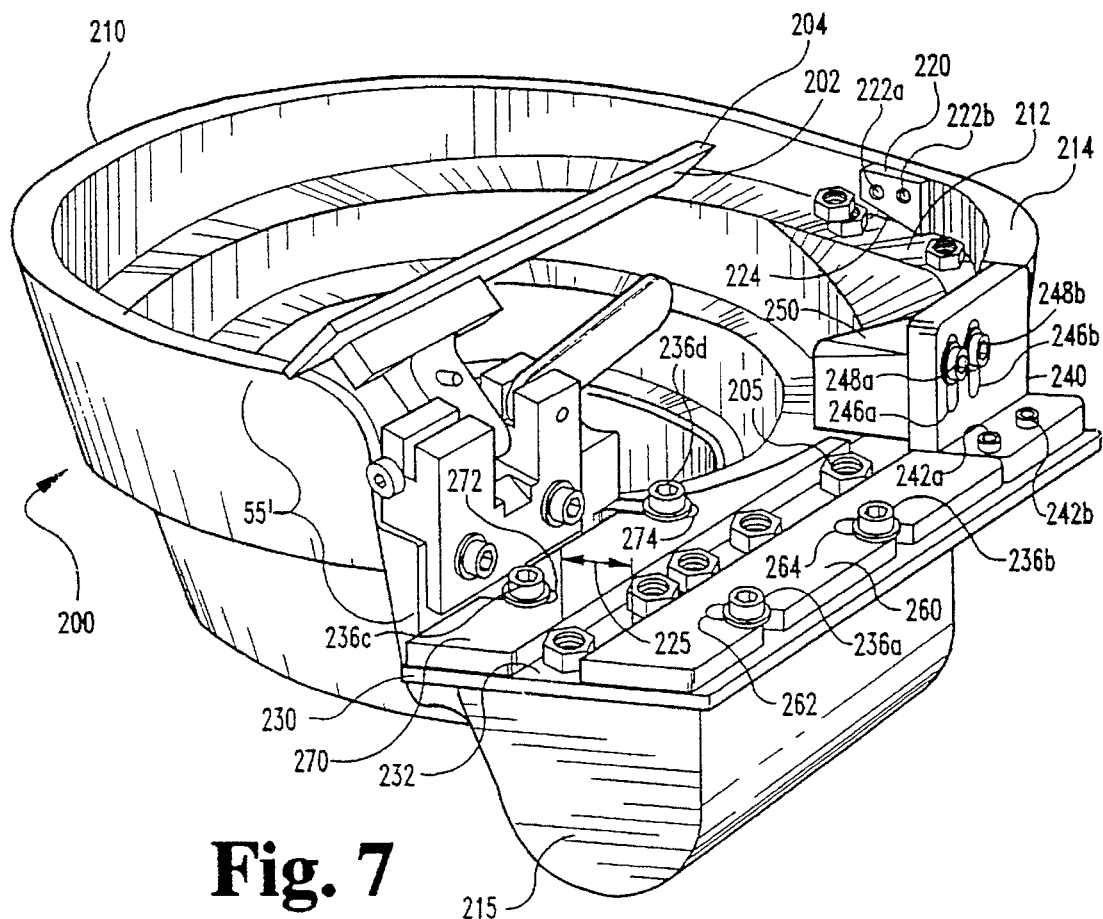
FIG. 7 is a right front perspective view of a vibratory parts feeder with pivotal top confinement in accordance with an alternate embodiment of the present invention.
Figure 9:
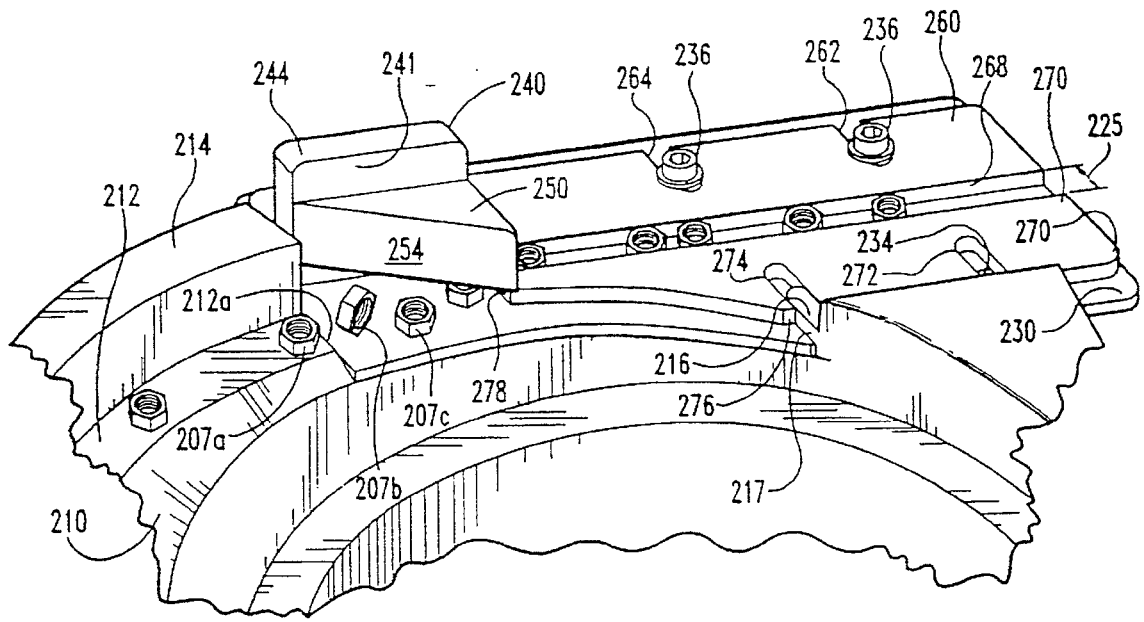
FIG. 9 is a left perspective view of the embodiment shown in FIG. 7, with the pivotal top confinement structure omitted therefrom for clarity, showing details of the parts entrance block and parallel blades.
Figure 8:
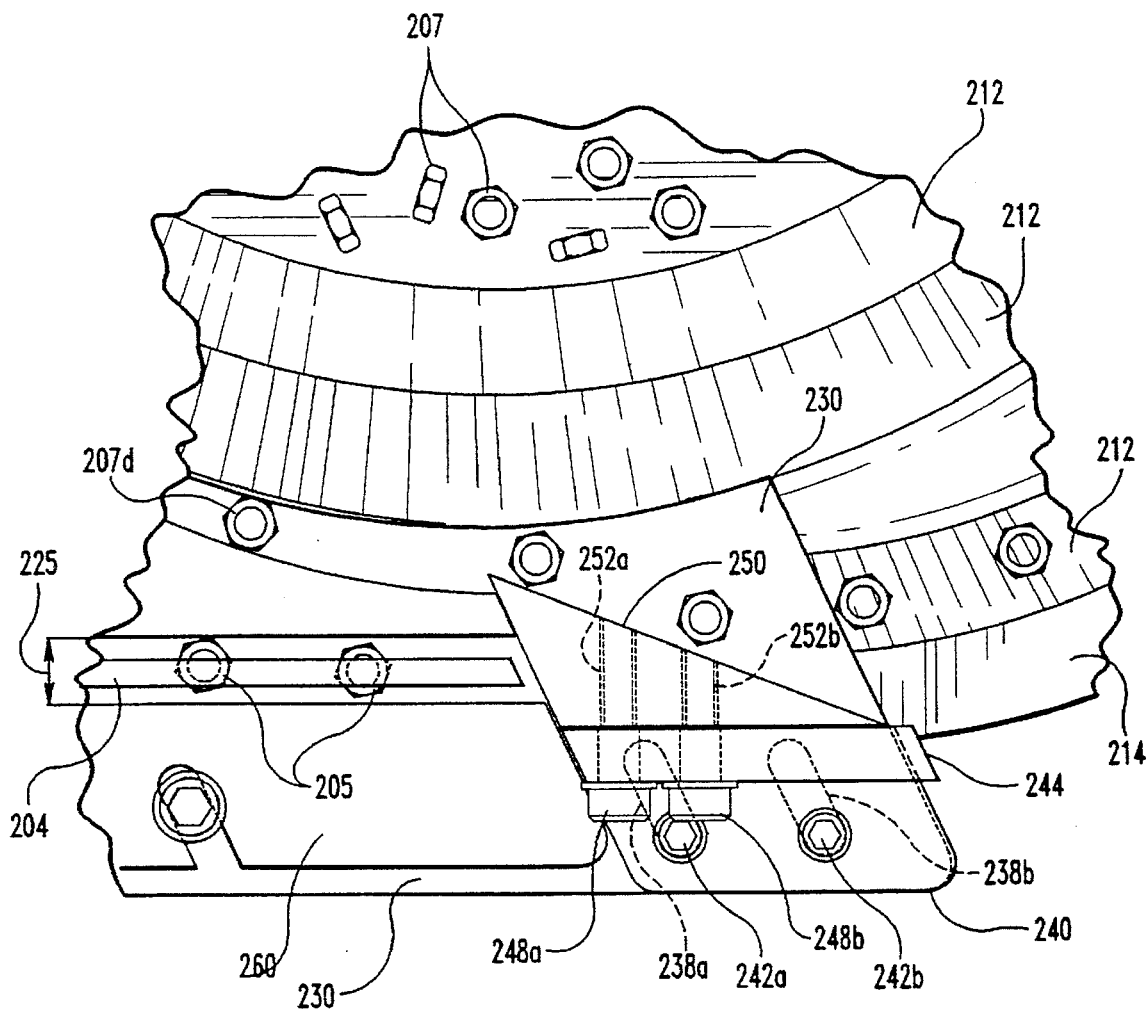
FIG. 8 is a top plan view of the parts receiving portion of the embodiment shown in FIG. 7.

Referring now to FIGS. 7 and 8, an alternative parts feeding apparatus embodiment 200 is shown. Generally, parts feeding apparatus 200 is useful for orienting nonelongated parts such as threaded nuts, washers, coins, and the like, as well as certain compact assemblies and subassemblies. The parts feeding apparatus 200 utilizes a parts confining unit 55' which is identical in most respects to the parts confining unit 55 described with respect to FIGS. 1–6, and will therefore not be discussed further. The sole difference between parts confining unit 55' and parts confining unit 55 is the configuration of top confinement blade 202. As shown in FIG. 7, top confinement blade 202 lacks the angled edge 194 of top confinement blade 190 and instead includes a right-angled edge 204 in place thereof.

Parts feeding apparatus 200 includes a vibratory bowl 210 which is similar in many respects to the vibratory bowl 20 as described with respect to FIGS. 1–6. For example, vibratory bowl 210 includes a parts transportation track 212 defined therein which terminates at a discharge portion 212a. Similarly, bowl 210 includes an upper rim 214 for preventing the parts from escaping therefrom under vibratory action. However, since the parts feeding apparatus 200 is not intended for use with elongated parts, the parts orientation unit support 215 need not be bifurcated as with the previous embodiment, but may be a solid construction as shown in FIG. 7.

Attached to parts orientation support 215 is a base plate 230. Base plate 230 is intended to provide a surface 232 for directing parts into the channel 225, and for providing a support surface under channel 225.

An outside parallel blade 260, similar to parallel blade 60 of the previous embodiment, includes grooves 262 and 264 for receiving screws 236a and 236b. As with the previous embodiment, the parts orientation unit support 215 includes threaded inserts molded therein for threadingly receiving screws, such as screw 236a. Outside parallel blade 260 is positioned on top of the base plate 230, and may be laterally adjusted relative to screws 236a and 236b to provide a desired channel width 225. An inside parallel blade 270 is also included and has grooves 272 and 274 for receiving screws 236c and 236d, respectively. As with outside parallel blade 260, inside parallel blade 270 may be laterally adjusted to provide a desired channel width 225 therebetween. As with the previous embodiment, vibratory bowl 210 includes a projection 216, and inside parallel blade 270 includes a projection 276 which are correspondingly configured to provide a non-jamming surface regardless of the lateral position of the inside parallel blade 270.

Parts feeding apparatus 200 further includes an entrance mount 240 having an entrance block 250 attached thereto. As most clearly shown in FIG. 8, base plate 230 includes a pair of slots 238a and 238b therethrough, a pair of bores are correspondingly defined within the entrance mount 240 which are axially aligned with slots 238a and 238b. Screws 242a and 242b are provided therethrough for attaching the entrance mount 240 to the base plate 230. Due to the slots 238a and 238b, the entrance mount 240 may be adjusted perpendicularly toward and away from the longitudinal axis of channel 225. Entrance mount 240 may therefore be adjusted so that surface 241 is flush with edge 268 of outside parallel blade 260.

Entrance mount 240 further includes a vertical portion 244 having slots 246a and 246b disposed therethrough.

Entrance block 250 includes corresponding threaded bores 252a and 252b for receiving screws 248a and 248b as shown in FIGS. 7 and 8. The height of entrance block 250 above the channel 225 may thereby be adjusted to accommodate parts having different heights.

Finally, parts feeding apparatus 200 includes a sweep 220 attached to the vibratory bowl 210 above the parts track 212 and remote from the discharge port 212a. Sweep 220 defines a pair of bores therethrough for receiving screws 222a and 222b. As with all other screw-type attachments to bowl 210, a pair of threaded inserts, identical to those described with respect to the previous embodiment, are cast within the bowl 210 for receiving screws 222a and 222b. Sweep 220 includes a sloped surface 224 which slopes generally downwardly in the direction of parts movement along parts track 212. In feeding parts having flat surfaces, such as washers and threaded nuts, it is possible that parts may be fed along parts track 212 in a stacked or piggy-back fashion as shown in FIG. 7. The purpose of sweep 220 is to separate such a stack and provide separate or discrete parts to discharge port 212a. Sweep 220 is thus positioned so that its lowest portion of surface 224 permits passage of a single, and properly oriented, part therethrough. The surface 224 is sloped to a sufficient degree to permit a stack of parts to be separated while maintaining the separated parts on the parts track 212. Preferably, surface 224 is sloped at an angle of approximately 20 degrees, although the present invention contemplates slopes of between 5 degrees and 70 degrees.

In operation, a disoriented mass of parts, such as washers, threaded nuts, and the like, are provided within the vibratory bowl 210 as partially shown in FIG. 8. Under vibratory action, provided by a vibratory drive unit (not shown), the parts 207 travel, in a circumferential manner, along the parts track 212 toward the discharge port 212a. If parts become stacked or piggy-backed along the way, sweep 220 separates the stacks into individual or discrete parts for further transportation toward discharge port 212a. Upon reaching discharge port 212a, properly oriented parts, such as part 207a, will pass under the entrance block 250 and be received and oriented within the channel 225, such as part 205 shown in FIGS. 7 and 8. Parts laving orientations other than those permitted to be received within the channel 225 are directed back into the vibratory bowl 210. One mechanism for directing parts back into the bowl 210 is the angled surface 254 of entrance block 250. If a part has been turned on its edge, such as part 207b, the part will not be permitted to pass under the entrance block 250, and the angled surface 254 of the entrance block 250 will direct the part back into the vibratory bowl 210. A second mechanism for directing parts back into the vibratory bowl 210 is the edge 278 of inside parallel blade 270. If a part, such as part 207c, is not close enough to the surface 241 of the entrance mount 240, the angled edge 278 of the inside parallel blade 270 will direct the part back into the vibratory bowl 210. If part 207c is located to close to the interior of bowl 210, and does not contact surface 278 of blade 270, it may continue along the top surface of base plate 203 as shown by part 207d in FIG. 8. In such a case, surface 217 of projection 216 will direct the part 207d back into the vibratory bowl 210.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A parts feeding apparatus for providing oriented parts having common configuration, the apparatus comprising:

a vibratory bowl having a discharge port, said bowl being configured to receive a disoriented mass of the parts therein, and having an inner surface configured to transport each of said parts, in a circumferential manner, toward said discharge port under vibratory action; and a parts orientation unit detachably mounted to said bowl adjacent said discharge port for vibration therewith, said parts orientation unit receiving parts having a number of orientations from said discharge port and serially providing the parts in a predetermined orientation, said parts orientation unit including:

a receiving unit mounted adjacent said discharge port receiving the parts therefrom and orienting the parts according to said predetermined orientation; and a confining member pivotably attached to said bowl, said confining member being pivotable between a first position adjacent said receiving unit and a second position remote from said receiving unit, said confining member including a locking member rigidly securing said confining member in said first position to thereby maintain the parts in said predetermined orientation when said locking member is in a locked position, said locking member permitting said confining member to freely pivot between said first and second positions when said locking member is in an unlocked position.

2. The parts feeding apparatus of claim 1 further including:

a support member rigidly secured to said vibratory bowl;

wherein said confining member is pivotably attached to said bowl via said support member.

3. The parts feeding apparatus of claim 2 wherein said locking member includes a lever pivotably attached to said support member, said lever being pivotable between said locked position and said unlocked position.

4. The parts feeding apparatus of claims 3 wherein said support member includes a first channel therein for receiving said lever in said locked position, and further wherein said lever bears against said confining member in said locked position to thereby rigidly secure said confining member in said first position.

5. The parts feeding apparatus of claim 4 wherein said lever includes a leading edge, and a portion of said leading edge bears against said confining member in said locked position, and further wherein said leading edge of said lever is rounded to permit said lever to force said confining member into said first position as said lever is pivoted from said unlocked position to said locked position.

6. The parts feeding apparatus of claim 5 wherein said confining member includes a second channel therein, and further wherein said leading edge of said lever bears against said second channel as said lever is pivoted from said unlocked position to said locked position to thereby force said second channel into axial alignment with said first channel, said lever being positioned within said first and second channels when said lever is in said locked position.

7. The parts feeding apparatus of claim 2 wherein said vibratory bowl is cast from an epoxy resin material.

8. The parts feeding apparatus of claim 7 wherein said vibratory bowl includes attachment members cast within said bowl for rigidly attaching said support member thereto.

9. The parts feeding apparatus of claim 8 wherein said parts orientation unit further includes a deflector plate having a first portion disposed between said support member and said vibratory bowl, and a second portion positioned between said support member and said confining member adjacent said receiving unit, and wherein said first deflector plate portion provides a surface between said support member and said attachment members cast within said bowl to keep said attachment members from being extracted from said bowl when said support member is rigidly secured thereto, and further wherein said second deflector plate portion directs parts having an orientation other than one of said number of orientations back into said vibratory bowl.

10. The parts feeding apparatus of claim 9 wherein the parts having common configuration include elongated parts each having a head with a first diameter and a reduced diameter shaft extending therefrom.

11. The parts feeding apparatus of claim 8 wherein the parts having common configuration include one of threaded nuts and washers.

12. A parts feeding apparatus for providing oriented parts having common configuration, the apparatus comprising:

a vibratory bowl having a discharge port, said bowl being configured to receive a disoriented mass of the parts therein, and having an inner surface configured to transport each of said parts, in a circumferential manner, toward said discharge port under vibratory action; and a parts orientation unit detachably mounted to said bowl adjacent said discharge port for vibration therewith, said parts orientation unit receiving parts having a number of orientations from said discharge port and serially providing the parts in a predetermined orientation, said parts orientation unit including:

a receiving unit mounted adjacent said discharge port for receiving the parts therefrom, said receiving unit including first and second parallel blades defining a channel therebetween for orienting the parts according to said predetermined orientation, said first and second parallel blades being adjustably mounted to said bowl to provide a range of channel widths; and a confining member pivotably attached to said bowl, said confining member being pivotable between a first position adjacent said channel and a second position remote from said channel, said confining member including a locking member rigidly securing said confining member in said first position to thereby maintain the parts in said predetermined orientation within said channel when said locking member is in a locked position.

13. The parts feeding apparatus of claim 12 wherein said parts orientation unit further includes a deflector plate having a first portion extending between said channel and said vibratory bowl adjacent said first blade, and wherein said first deflector plate portion directs parts having an orientation other than one of said number of orientations back into said vibratory bowl.

14. The parts feeding apparatus of claim 13 wherein said first blade includes a projection extending therefrom toward said bowl, said projection being positioned between said first deflector plate portion and said discharge port, and wherein said vibratory bowl is correspondingly configured to receive said projection so that surface discontinuity between said first blade and said bowl is minimized throughout said range of channel widths, and wherein said minimization of said surface discontinuity correspondingly minimizes lodging of the parts between said first blade and said vibratory bowl.

15. The parts feeding apparatus of claim 14 wherein the parts having common configuration include elongated parts each having a head with a first diameter and a reduced diameter shaft extending therefrom.

16. The parts feeding apparatus of claim 15 wherein said channel includes a slot having sufficient width for receiving said reduced diameter shafts therein, yet disallowing the passage of said heads therethrough.

17. The parts feeding apparatus of claim 12 further including a base plate positioned between said bowl and said first and second blades, said base plate defining a bottom of said channel for supporting the parts having said predetermined orientation.

18. The parts feeding apparatus of claim 17 further including an entrance block adjustably mounted to said base plate adjacent said discharge port;

wherein said entrance block has a first surface extending across said discharge port at a predetermined angle relative to the longitudinal axis of said channel;

and wherein said first surface is operable to direct parts having orientations other than said number of orientations back into said bowl.

19. The parts feeding apparatus of claim 18 wherein said entrance block includes a bottom surface adjustably positioned at a sufficient height above said channel to permit parts having any of said number of orientations to enter said channel.

20. The parts feeding apparatus of claim 19 wherein said first blade is disposed between said channel and said pivotable attachment and includes a projection extending therefrom toward said bowl, and wherein said vibratory bowl is correspondingly configured to receive said projection so that surface discontinuity between said first blade and said bowl is minimized throughout said range of channel widths, and further wherein said minimization of said surface discontinuity correspondingly minimizes lodging of the parts between said first blade and said vibratory bowl.

21. The parts feeding apparatus of claim 20 wherein said first blade includes a first edge facing said discharge port, said first edge being configured to direct parts having orientations other than said number of orientations back into said bowl.

22. The parts feeding apparatus of claim 21 further including a sweep mounted to said bowl remote from said discharge port;

wherein said sweep is operable to reduce stacks of parts to discrete parts for further transportation toward said discharge port.

23. The parts feeding apparatus of claim 22 wherein the parts having common configuration include one of threaded nuts and washers.

24. A parts orientation apparatus for use in cooperative arrangement with a vibratory bowl parts feeder to provide oriented parts having a common configuration, said vibratory bowl having a mass of disoriented parts therein and a parts discharge port, said parts orienting apparatus being detachably mounted to said vibratory bowl adjacent said discharge port, said parts orienting apparatus comprising:

a receiving unit mounted adjacent said discharge port for receiving the parts therefrom and orienting the parts according to said predetermined orientation; and a confining member pivotably attached to said bowl, said confining member being pivotable between a first position adjacent said receiving unit and a second position remote from said receiving unit, said confining member including a locking member rigidly securing said confining member in said first position to thereby maintain the parts in said predetermined orientation when said locking member is in a locked position, said locking member permitting said confining member to freely pivot between said first and second positions when said locking member is in an unlocked position.

25. The parts orientation apparatus of claim 24 wherein said receiving unit includes a pair of parallel guide members, said parallel guide members being adjustably mounted to said bowl and defining a channel having adjustable width therebetween, and wherein said channel is adapted to orient the parts with said predetermined orientation.

26. The parts orientation apparatus of claim 25 wherein the parts having common configuration include elongated parts each having a head with a first diameter and a reduced diameter shaft extending therefrom.

27. The parts feeding apparatus of claim 26 wherein said channel includes a slot having sufficient width for receiving said reduced diameter shafts therein, yet disallowing the passage of said heads therethrough.

28. The parts feeding apparatus of claim 25 wherein the parts having common configuration include one of threaded nuts and washers.

29. The parts feeding apparatus of claim 28 wherein said channel has sufficient width for receiving the parts therein, and sufficient depth for receiving the parts therein according to said predetermined orientation.

30. The parts feeding apparatus of claim 1 wherein said vibratory bowl defines a parts orientation member extending from said discharge port, said parts orientation member having said receiving unit mounted thereto.

31. The parts feeding apparatus of claim 30 wherein said parts orientation member includes a first surface, a second surface and a hollow recess defined therebetween, said receiving unit mounted to said first and second surfaces of said parts orientation member.

32. The parts feeding apparatus of claim 31 wherein said vibratory bowl is cast from an epoxy resin material.

33. The parts feeding apparatus of claim 32 wherein said first and second surfaces of said parts orientation member include attachment members cast therein for rigidly securing said receiving unit to said first and second surfaces.

* * * * *